United States Patent
Kim et al.

(10) Patent No.: US 12,033,659 B1
(45) Date of Patent: Jul. 9, 2024

(54) METHOD FOR DETERMINING AND LINKING IMPORTANT PARTS AMONG STT RESULT AND REFERENCE DATA

(71) Applicant: ActionPower Corp., Seoul (KR)

(72) Inventors: Hyungwoo Kim, Gyeonggi-do (KR); Hwanbok Mun, Seoul (KR); Kangwook Kim, Seoul (KR)

(73) Assignee: ActionPower Corp., Seoul (KR)

( * ) Notice: Subject to any disclaimer, the term of this patent is extended or adjusted under 35 U.S.C. 154(b) by 0 days.

(21) Appl. No.: 18/397,586

(22) Filed: Dec. 27, 2023

(30) Foreign Application Priority Data

Jan. 3, 2023 (KR) .......... 10-2023-0000740

(51) Int. Cl.
 *G10L 15/00* (2013.01)
 *G10L 15/26* (2006.01)
 *G10L 25/51* (2013.01)

(52) U.S. Cl.
 CPC .............. *G10L 25/51* (2013.01); *G10L 15/26* (2013.01)

(58) Field of Classification Search
 CPC ......... G10L 15/16; G10L 15/26; G10L 25/51; G06Q 10/10
 USPC ...................................................... 704/200
 See application file for complete search history.

(56) References Cited

U.S. PATENT DOCUMENTS

| | | | |
|---|---|---|---|
| 11,171,905 B1 | 11/2021 | Ledet | |
| 11,676,580 B2 * | 6/2023 | Park | G10L 15/16 |
| | | | 704/200 |
| 2009/0060471 A1 | 3/2009 | Park et al. | |
| 2009/0204399 A1 | 8/2009 | Akamine | |

FOREIGN PATENT DOCUMENTS

| | | |
|---|---|---|
| JP | 5045670 B2 | 10/2012 |
| KR | 101449430 B1 | 10/2014 |
| KR | 10-2020-0077095 A | 6/2020 |
| KR | 102287431 B1 | 8/2021 |
| KR | 102298330 B1 | 9/2021 |
| KR | 102365611 B1 | 2/2022 |
| KR | 10-2022-0043505 A | 4/2022 |
| KR | 102389153 B1 | 4/2022 |

(Continued)

OTHER PUBLICATIONS

Antoine Tixier et al., Combining graph degeneracy and submodularity for unsupervised extractive summarization. In Proceedings of the workshop on new frontiers in summarization, 48-58 pages.

(Continued)

*Primary Examiner* — Md S Elahee
(74) *Attorney, Agent, or Firm* — MARSHALL, GERSTEIN & BORUN LLP

(57) ABSTRACT

Disclosed is a method for determining important parts among a speech-to-text (STT) result and reference data, which is performed by a computing device. The method may include acquiring STT data generated by performing STT with respect to a speech signal; acquiring reference data; determining first important information in one data among the STT data and the reference data; and determining second important information linked with the first important information in other data different from data in which the first important information is determined among the STT data and the reference data.

16 Claims, 9 Drawing Sheets

(56) References Cited

FOREIGN PATENT DOCUMENTS

| | | |
|---|---|---|
| KR | 102389995 B1 | 4/2022 |
| KR | 10-2022-0068716 A | 5/2022 |
| KR | 10-2022-0158644 A | 12/2022 |
| WO | WO-2016043110 A1 | 3/2016 |

OTHER PUBLICATIONS

Bogdan Gliwa et al., SAMSum Corpus: A Human-annotated Dialogue Dataset for Abstractive Summarization, Proceedings of the 2nd Workshop on New Frontiers in Summarization, Association for Computational Linguistics . Nov. 1, 2019.

Il Joo LEE et al., Document Summarization Based on Sentence Clustering Using Graph Division, Korea Information Processing Society, Apr. 1, 2006.

Korean Notice of Allowance for Application No. 10-2023-0000740, dated May 22, 2023.

Korean Office Action for Application No. 10-2023-0000740, dated Mar. 10, 2023.

\* cited by examiner

US 12,033,659 B1

METHOD FOR DETERMINING AND LINKING IMPORTANT PARTS AMONG STT RESULT AND REFERENCE DATA

CROSS-REFERENCE TO RELATED APPLICATIONS

This application claims priority to and the benefit of Korean Patent Application No. 10-2023-0000740 filed in the Korean Intellectual Property Office on Jan. 3, 2023, the entire contents of which are incorporated herein by reference.

TECHNICAL FIELD

The present disclosure relates to a method for determining important parts from a plurality of data, and more particularly, to technology for determining important parts and linking the important parts with each other among an STT result and reference data.

BACKGROUND ART

Nowadays, in an age of information overload, too much information is a problem. Users who use a speech to text (STT) service have a problem that there are too many types of data to view. For example, college students who use the STT service to use Internet lectures for learning must view all recorded lecture videos, an STT result text of a speech, written contents, or lecture materials PDF.

From a user's perspective, it may be difficult to view all of this diverse and vast data, and they may want to extract only the important parts. However, it is not known which parts are important among the plurality of related data (e.g., STT result text, writing notes, and related content) and which parts correspond to each important part, so there is inconvenience in that the important parts in each of the plurality of data should be checked.

Korean Patent Registration No. 10-1449430 (Oct. 2, 2014) discloses a method and an apparatus for generating move-in-short of contents.

SUMMARY OF THE INVENTION

The present disclosure has been made in an effort to provide a method for determining important parts among an STT result and reference data, and linking the determined important parts with each other.

Meanwhile, a technical object to be achieved by the present disclosure is not limited to the above-mentioned technical object, and various technical objects can be included within the scope which is apparent to those skilled in the art from contents to be described below.

An exemplary embodiment of the present disclosure provides a method performed by a computing device. The method may include acquiring STT data generated by performing STT with respect to a speech signal; acquiring reference data; determining first important information in one data among the STT data and the reference data; and determining second important information linked with the first important information in other data different from data in which the first important information is determined among the STT data and the reference data.

In an exemplary embodiment, the determining of the first important information in the one data among the STT data and the reference data may include at least one of determining the first important information based on a user input, or determining the first important information based on a predetermined keyword information.

In an exemplary embodiment, the determining of the first important information based on the predetermined keyword information may include selecting the one data among the STT data and the reference data based on the predetermined keyword information, and determining the first important information in the selected data based on the predetermined keyword information.

In an exemplary embodiment, the selecting of the one data among the STT data and the reference data based on the predetermined keyword information may include selecting data including more words similar to the predetermined keyword among the STT data and the reference data, and a word similar to the predetermined keyword may be determined based on an edit distance analysis.

In an exemplary embodiment, the determining of the first important information in the selected data based on the predetermined keyword information may include identifying a part in the selected data, which has a highest similarity to the predetermined keyword, and determining the first important information based on the identified part, and the similarity to the predetermined keyword may be determined based on an edit distance analysis.

In an exemplary embodiment, the determining of the second important information linked with the first important information in the other data different from the data in which the first important information is determined among the STT data and the reference data may include at least one of determining a part in which a word similarity to the first important information is equal to or greater than a threshold as the second important information in the other data, determining a part in which a sentence embedding vector similarity to the first important information is equal to or greater than a threshold in the other data as the second important information, determining the second important information in the other data based on a result output by a question answering (QA) model in relation to the first important information and the other data, or determining the second important information in the other data based on time-sync information.

In an exemplary embodiment, the determining of the part in which the word similarity to the first important information is equal to or greater than the threshold as the second important information in the other data may include identifying a part including same words as or similar words to the first important information in a number of a threshold or more, in the other data, and determining the identified part as the second important information, and a similar word may be identified based on an edit distance.

In an exemplary embodiment, the determining of the second important information linked with the first important information in the other data different from the data in which the first important information is determined among the STT data and the reference data may include generating user interface (UI) data for guiding determination of the second important information, and determining the second important information linked with the first important information based on information input through the UI in the other data.

In an exemplary embodiment, the determining of the second important information linked with the first important information in the other data different from the data in which the first important information is determined among the STT data and the reference data may includes determining a language unit different from the first important information as the second important information in the other data, and the different language unit may include a word unit, a sentence unit, or a paragraph unit.

In an exemplary embodiment, the reference data may be identified based on a similarity analysis to the STT data, and the similarity analysis may include an edit distance analysis.

In an exemplary embodiment, the reference data may include at least one data of note data linked with the speech signal, content data linked with the speech signal, or learning material data linked with the speech signal.

In an exemplary embodiment, the method may further include acquiring additional reference data; determining third important information linked with the first important information and the second important information in the additional reference data; and linking the first important information, the second important information, and the third important information with each other.

In an exemplary embodiment, the method may further include reconfiguring the STT data based on the first important information or the second important information, and providing the reconfigured STT data, and the reconfigured STT data may include only STT data determined as an important part, and the reconfigured STT data may include a language unit larger than a language unit of the first important information or the second important information.

In an exemplary embodiment, the method may further include reconfiguring the reference data based on the first important information or the second important information, and generating the reconfigured reference data, and when the reference data includes video data, the reconfigured reference data may be generated by combining only partial videos determined as an important part.

In an exemplary embodiment, the method may further include generating summary information for the STT data based on the first important information or the second important information, and the summary information may be generated by using a weight based on the first important information or the second important information.

Another exemplary embodiment of the present disclosure provides a computer program stored in a non-transitory computer-readable storage medium. The computer program allows the one or more processors to execute the following operations for determining an STT result and reference data when the computer program is executed by one or more processors, and the operations may include: an operation of acquiring STT data generated by performing STT with respect to a speech signal; an operation of acquiring reference data; an operation of determining first important information in one data among the STT data and the reference data; and an operation of determining second important information linked with the first important information in other data different from data in which the first important information is determined among the STT data and the reference data.

Another exemplary embodiment of the present disclosure provides a computing device. The device may include at least one processor; and a memory, and the at least one processor may be configured to acquire STT data generated by performing STT with respect to a speech signal, acquire reference data, determine first important information in one data among the STT data and the reference data, and determine second important information linked with the first important information in other data different from data in which the first important information is determined among the STT data and the reference data.

According to an exemplary embodiment of the present disclosure, a method for determining important parts among an STT result and reference data, and linking the determined important parts with each other can be provided, and enhanced user experience (UX) related to STT can be implemented through the method. Further, the present disclosure can provide technical solutions for determining the important parts linked with each other among the STT result and the reference data.

Meanwhile, the effects of the present disclosure are not limited to the above-mentioned effects, and various effects can be included within the scope which is apparent to those skilled in the art from contents to be described below.

DETAILED DESCRIPTION

Figure 1:
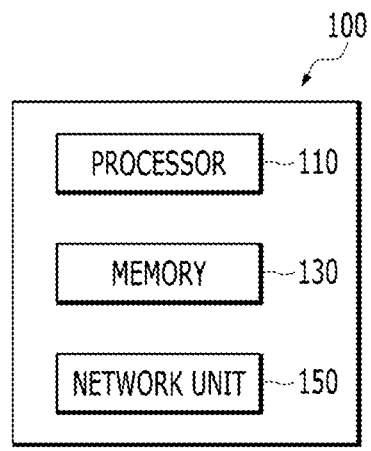
FIG. 1 is a block diagram of a computing device for determining important parts among an STT result and reference data according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for determining important parts from a speech-to-text (STT) result and reference data according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 150 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

The network unit 150 according to an exemplary embodiment of the present disclosure may use an arbitrary type known wired/wireless communication systems.

Figure 2:
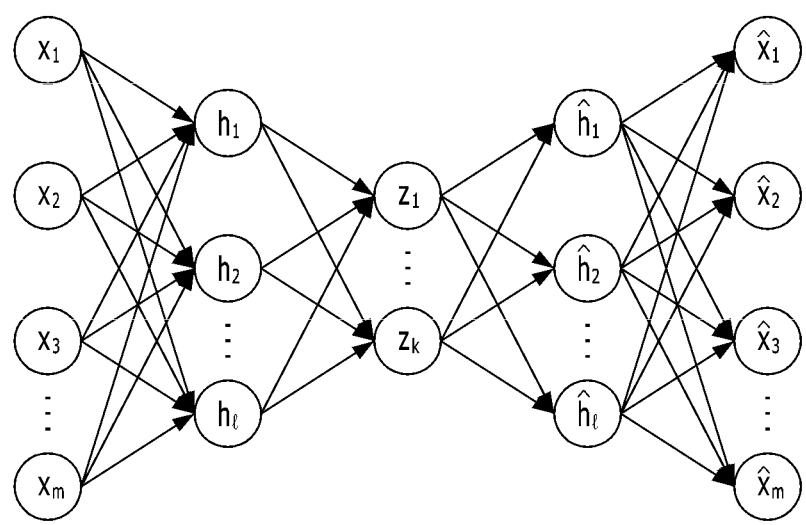
FIG. 2 is a schematic view illustrating a network function according to an exemplary embodiment of the present disclosure.

FIG. 2 is a schematic diagram illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting training data into the neural network and calculating the output of the neural network for the training data and the error of a target and back-propagating the errors of the neural network from the output layer of the neural network toward the input layer in a direction to reduce the errors to update the weight of each node of the neural network. In the case of the supervised learning, the training data labeled with a correct answer is used for each training data (i.e., the labeled training data) and in the case of the unsupervised learning, the correct answer may not be labeled in each training data. That is, for example, the training data in the case of the supervised learning related to the data classification may be data in which category is labeled in each training data. The labeled training data is input to the neural network, and the error may be calculated by comparing the output (category) of the neural network with the label of the training data. As another example, in the case of the unsupervised learning related to the data classification, the training data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the training data may be generally a subset of actual data (i.e., data to be processed using the learned neural network), and as a result, there may be a learning cycle in which errors for the training data decrease, but the errors for the actual data increase. Overfitting is a phenomenon in which the errors for the actual data increase due to excessive learning of the training data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the training data, regularization, dropout of omitting a part of the node of the network in the process of learning, utilization of a batch normalization layer, etc., may be applied.

According to an exemplary embodiment of the present disclosure, speech recognition (STT or ASR; Speech To Text, or Automatic Speech Recognition) is a dictation technology that converts speech into text. In other words, the STT is a technology that generates text (according to spelling) corresponding to the speech. An input of this STT may include at least one of a speech signal, a spectrogram converted from the speech signal, or a speech feature. Additionally, an output of the STT is text in the form of a character string. Meanwhile, the STT model may be implemented in various types of models, including a neural network model. Further, the STT models may be divided into a modularized scheme and a non-modularized end-to-end (e2e) scheme depending on an implemented scheme. Here, the modularized scheme may include an acoustic model (a model that indicates what form the speech signal may be expressed in), a language model (a model that assigns a generation probability in words based on given sentences and words), and a traditional model that perform speech recognition separately by a pronunciation lexicon (for example, some models of Kaldi toolkit-based ASR models, Hybrid-ASR models, etc.), but is not limited thereto. On the contrary, the non-modularized scheme mainly refer to e2e models (e.g., transformer-based encoder decoder models, etc.), and models may be generated by training a lot of data without providing sub-modules. Meanwhile, a beam search technique is a representative decoding technique, and the beam search technique is a method that does not predict only one word that is closest to a ground truth depending on a situation, but finds a most optimal ground truth by considering an entire sentence by opening up various possibilities.

According to an exemplary embodiment of the present disclosure, an edit distance may be determined by various schemes. For example, the edit distance may be determined as a minimum edit number required for converting one character string into the other character string when there are two character strings. Further, herein, the type of edit may include character deletion, insertion, substitution, etc. Further, the edit distance may be computed based on a pronunciation or computed based on a text. For example, the edit distance may be computed based on converting the text into a pronunciation symbol, or computed based on the text itself (for example, computed in units of a grapheme). Further, an edit distance algorithm may include Levenshtein distance, Longest common subsequence, Hamming distance, etc., and may include various algorithms in addition to the algorithm.

Meanwhile, in relation to text information T and a keyword set ($Q=\{q_1, q_2, \ldots, q_n\}$) (in this case, both of T and $q_i$ are character strings having a length of 1 or more), when a character string interval is searched in which an edit distance from any element of the keyword set Q in the text information T is equal to or less than a threshold, if a naïve edit distance algorithm or a simple edit distance computation algorithm is used, there is a problem in that a runtime increases exponentially. In order to solve this problem, the computing device 100 according to an exemplary embodiment of the present disclosure may utilize approximate information about a plurality of character strings included in the text information T or the keyword set Q, and perform a search by using the approximated information. For example, the computing device 100 according to an exemplary embodiment of the present disclosure may determine a word in which an edit distance from the keyword set Q is equal to or less than a threshold among words included in the text information T as a similar word by using a multi-string approximate (fuzzy) matching algorithm.

For example, when there is one keyword q to be searched (e.g., when the size of the keyword set Q is 1), the computing device 100 may determine the word in which edit distance from the keyword q is equal to or less than the threshold among the words included in the text information T by using a PEX algorithm. Further, the computing device 100 may determine an interval in which the edit distance from the keyword q (a unique element of Q) in the text information T is equal to or less than the threshold k, and identify words based on the determined interval. In this case, the computing device 100 may determine the interval in which the edit distance from the keyword q in the text information T is equal to or less than the threshold k based on a premise that "when there is a ground truth interval (i.e., the interval in which the edit distance from the keyword is equal to or less than the threshold k) in the text information T, when the keyword q is divided into k+1 elements, at least one among k+1 elements is present in the ground truth interval". For example, the computing device 100 may divide the keyword q into k+1 elements, and then search the k+1 elements in the text information T by using the multi-string exact matching algorithm (e.g., Aho-corasick, etc.), and when at least one element among the k+1 elements is searched in the text information T, the computing device 100 may identify a word in which the edit distance is equal to or less than the threshold k in an interval (e.g., an interval which is as long as a length of the keyword q at both sides of the searched element) around the searched element. Further, when all of the k+1 elements are not searched in the text information T, the computing device 100 may determine that "the word in which the edit distance from the keyword q is equal to or less than the threshold k is not present in the text information T".

As another example, when there are two or more keywords to be searched (e.g., when the size of the keyword set Q is 2 or more), the computing device 100 may determine the word in which the edit distance from the keyword ($q_1$, $q_2$, ...) is equal to or less than the threshold among the words included in the text information T by using a Multi-PEX algorithm. First, the computing device 100 may divide each of all keywords ($q_1$, $q_2$, ...) included in the keyword set Q into k+1 elements. Further, the computing device 100 may search all elements of the keyword set Q by applying the elements to the same multi-string exact matching algorithm at once. As an example, when the Aho-corasick algorithm is used, the computing device 100 may search one trie including all elements of the keyword set Q. Further, when there is at least one element of the keyword set Q in the text information T, the computing device 100 may search whether there is the word in which the edit distance is equal to or less than the threshold k in a text (e.g., as long as a length of the keyword ($q_1$, $q_2$, ...) at both sides) interval around the corresponding element. Further, when the element of the keyword set Q searched is not present in the text information T, the computing device 100 may determine that "the word in which the edit distance from the keyword set Q is equal to or less than the threshold k is not present in the text information T".

For reference, STT data may be mixedly used, such as STT result text information T, the text information T, the STT result, an STT result text, etc., but a meaning that the words are "text data generated by performing the STT with respect to a speech signal" is not changed.

The present disclosure relates to a method for determining important parts (important information) from "a speech-to-text (STT) result" and "reference data". More specifically, the present disclosure relates to a method for (1) performing the STT for an input audio (for example, in the case of a video file, performing an audio file after separating an audio and an image), (2) determining first important information in first data which is one of the STT result text and the reference data, (3) determining second important information linked with the first important information in second data different from the first data among the STT result text and the reference data, and (4) reconfiguring the important parts. Here, the reference data may include at least any one data of note (=memo) data directly recorded by a user based on an input image and a speech, content data linked with the input image and speech, or learning material data (for example, PDF lecture materials) linked with the input image and speech. As an exemplary embodiment, the content data or learning material data may be data directly uploaded by the user, and data recommended based on a predetermined keyword and/or edit distance.

Figure 3:
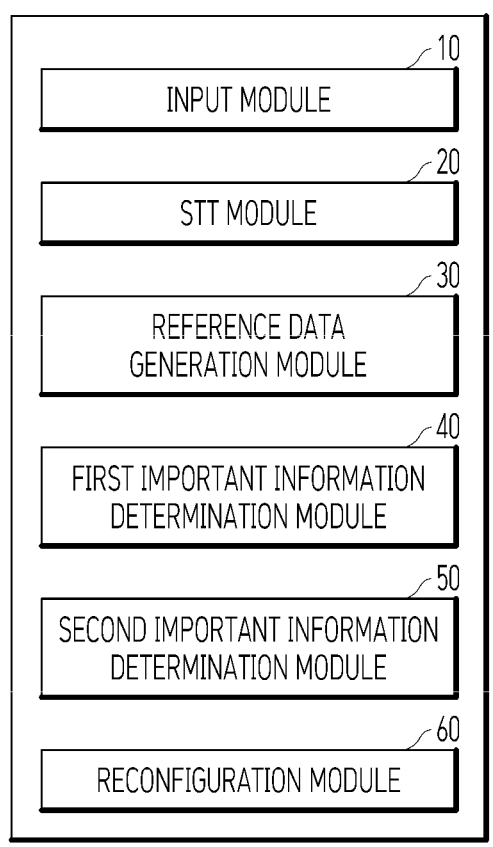
FIG. 3 is a block diagram of a plurality of modules for determining important parts among an STT result and reference data according to an exemplary embodiment of the present disclosure.

FIG. 3 is a block diagram of "a plurality of modules for determining important parts among an STT result and reference data" according to an exemplary embodiment of the present disclosure.

Referring to FIG. 3, the computing device 100 may include an input module 10, an STT module 20, a reference data generation module 30, a first important information determination module 40, a second important information determination module 50, and a reconfiguration module 60. Meanwhile, plural modules that may be included in the computing device 100 may be controlled by the processor 110 or implemented by an operation of the processor 110. Additionally, in order to determine the important parts among the STT result and the reference data, modules that may be included in the computing device 100 are not limited to the plurality of modules, and may include additional modules. Hereinafter, an exemplary plurality of modules for determining the important parts among the STT result and the reference data will be described in more detail.

According to an exemplary embodiment of the present disclosure, the input module 10 may receive an audio signal or a spectrogram acquired by converting the audio signal. As an example, the input audio signal or spectrogram may be extracted from a video (e.g., a YouTube video, a recorded lecture video, a dialog recording speech file, etc.).

According to an exemplary embodiment of the present disclosure, the STT module 20 may acquire STT data generated by performing the STT with respect to the speech signal. The STT module 20 performs the STT with respect to the audio signal received from the input module 10 to output STT result text data. For reference, the STT module 20 may be configured by a neural network model based on deep learning. Further, the STT module 20 may perform preprocessing such as noise removal and speech enhancement, voice activity detection (VAD), speaker diarization, etc., with respect to the received audio prior to STT processing. Further, the STT module 20 may also include an ASR correction module or a sentence symbol insertion module as a postprocessing module that corrects an STT result text. Meanwhile, according to the type of STT model, a preprocessing or postprocessing module is not separately present, and each function may also be implemented in an end-to-end model.

According to an exemplary embodiment of the present disclosure, the reference data generation module 30 may acquire reference data. Here, the reference data may include at least one data of note data linked with the speech signal, content data linked with the speech signal, or learning material data linked with the speech signal. In this case, the reference data may be identified based on a similarity analysis to the STT data or searched from the outside. The similarity analysis may include the above-described edit distance analysis. Further, the reference data generation module 30 may also acquire data that further includes a word (similar word) similar to a predetermined keyword as the reference data based on STT data. For example, data stored in a user computer local, data searched from the outside (e.g., website), etc., may be acquired as the reference data. Further, the reference data generation module 30 may also acquire the data directly uploaded by the user as the reference data. According to an exemplary embodiment, the reference data generation module 30 may convert learning material data such as an image or PDF into a text based on a technique such as optical character recognition (OCR), etc. Further, the reference data generation module 30 may convert writing contents into the text by using the technique such as the OCR, etc., even when the user performs writing in the learning material data.

According to an exemplary embodiment of the present disclosure, the first important information determination module 40 may determine first important information in one data among the STT data and the reference data. Here, the first important information may include a word unit, a sentence unit, a paragraph unit, etc. For example, the first important information determination module 40 may i) determine first important information based on a user input or ii) determine the first important information based on predetermined keyword information.

First, the first important information determination module 40 may i) "determine the first important information based on the user input". For example, the first important information determination module 40 may determine information that the user determines to be important while listening to a speech or watching a video using the user terminal as the first important information. Further, the first important information determination module 40 may also recognize a part which is highlighted in advance in one data of the STT data and the reference data, and determine the corresponding part as the first important information. For reference, the time when the user determines the first important information may be before the STT data is acquired or after the STT data is acquired. For example, the first important information determination module 40 may determine important information which the user selects from STT data generated by performing the STT with respect to the speech signal as the first important information (i.e., the user may determine the first important information after the STT data is acquired). In addition, the first important information determination module 40 may mark important information (e.g., highlights) in the reference data while the user is listening to a speech or watching a video, recognize the marked part in the reference data uploaded later, and determine the corresponding part as the first important information (i.e., the user may also determine the first important information before acquiring the STT data). For example, if the user highlights learning materials while listening to a lecture, performs the STT on the lecture, and uploads the learning materials as reference data, the first important information determination module 40 may determine the highlighted part in the reference data, such as the lecture materials as the first important information.

Next, the first important information determination module 40 may ii) "determine the first important information based on the predetermined keyword information". As an example, if the user is taking a university course, the predetermined keyword information may include dictionary information into which the user inputs in relation to a primary keyword related to the corresponding lecture. For reference, the dictionary information may include text information which the user inputs note data included in the reference data while listening the speech or watching the video or text information in which the user inputs a thinking primary keyword after an operation of listening the speech or watching the video is ended. Further, the predetermined keyword information may be determined by using Term Frequency-Inverse Document Frequency (TF-IDF) technology, technology of segmenting the paragraph for each topic with respect to the STT data (topic segmentation), technology of determining the topic for each segmented paragraph (text classification), etc.

More specifically, the first important information determination module 40 may perform "an operation of selecting one data among the STT data and the reference data based on the predetermined keyword information", and "an operation of determining the first important information in the selected data based on the predetermined keyword information". For example, the first important information determination module 40 may select one data of the STT data and the reference data based on the predetermined keyword information (e.g., dictionary information). In an exemplary embodiment, the first important information determination module 40 may select the STT data as first data when relatively many predetermined keywords are included in the STT data. Further, the first important information determination module 40 may determine a part including relatively many predetermined keywords in the selected STT data (first data) as the first important information.

According to an exemplary embodiment, the first important information determination module 40 may select data in which the first important information is to be generated through keyword analysis based on the edit distance, identify a part in the selected data, which has a highest similarity to the predetermined keyword, and determine the first important information based on the identified part. As a more specific example, the first important information determination module 40 may select data including more words similar to the predetermined keyword among the STT data and the reference data. In this case, the word similar to the predetermined keyword may be determined based on the edit distance analysis. Further, the first important information determination module 40 may identify a part in the selected data, which has a highest similarity to the predetermined keyword, and determine the first important information based on the identified part. In this case, the similarity to the predetermined keyword may be determined based on the edit distance analysis. As an example, when the predetermined keyword is "Daglo", words including "Dagulo", "Dagunglo", "Dageunglo", etc., in which the edit distance from "Daglo" is equal to or less than a threshold may be identified from the STT result text information, and the identified words may be determined as "a word (e.g., a similar word) similar to the predetermined keyword". For example, the first important information determination module 40 may select STT data which is the data including more similar words (e.g., "Dagulo", "Dagunglo", "Dageunglo") to the predetermined keyword (e.g., "Daglo") among the STT data and the reference data as the first data. Further, the first important information determination module 40 may identify a part (e.g. a sentence, a paragraph, etc., including "Dagulo", "Dagunglo", "Dageunglo", etc.) which has a highest similarity to the predetermined keyword (e.g., "Daglo") in the STT data (first data) which is the selected data, and determine the first important information based on the identified part. For reference, the first important information determination module 40 may check even an edit distance based similar word, and determine whether the predetermined keyword is included, and determine the first important information, by considering "a problem in that a substitution error in which some of the STT data becomes wrong frequently occurs" or "a problem in that an error in which a character is wrongly recognized by OCR in the case of the reference data".

According to an exemplary embodiment of the present disclosure, the second important information determination module 50 may determine second important information linked with the first important information in other data (second data) different from data (first data) in which the first important information is determined among the STT data and the reference data. For example, the second important information determination module 50 may determine the second important information linked with the first important information in the reference data when the first important information is determined in the STT data by the first important information determination module 40. As another example, the second important information determination module 50 may determine the second important information linked with the first important information in linked content data in the reference data when the first important information is determined in linked note data in the reference data by the first important information determination module 40. Here, the reference data may include note data linked with the speech signal, content data linked with the speech signal, learning material data linked with the speech signal, etc.

Further, the second important information determination module 50 may also determine a language unit different from the first important information as the second important information in the other data (second data). In this case, the different language unit may include a word unit, a sentence unit, or a paragraph unit. For example, the first important information is the word unit, but the second important information may also be the paragraph or sentence unit. For reference, the data selected by the first important information determination module 40 may be the first data, and different data from the first data, which is not selected by the first important information determination module 40 may be referred to as the second data. For example, when the linked note data among a total of four types of data (three types of data including the reference data (linked note data, linked content data, and linked learning material data), and STT data) is determined as the first data, any one (e.g., the linked learning material data) among three types of remaining data (linked content data, and linked learning material data and STT data) may be referred to as the second data. Hereinafter, for convenience of description, the present disclosure will be described primarily based on an exemplary embodiment in which the second data is note data linked with the speech signal.

For example, the second important information determination module 50 may automatically determine the second important information linked with the first important information through at least one operation of (1) an operation of determining, as the second important information, a part in which a word similarity to the first important information is equal to or more than a threshold, in other data (i.e., data not selected by the first important information determination module) different from the first data, (2) an operation of determining a part in which a sentence embedding vector similarity to the first important information is equal to or more than a threshold in the other data as the second important information, (3) an operation of determining the second important information in the different data based on a result output by a question answering (QA) model in relation to the first important information and the other data, or (4) an operation of determining the second important information in the other data based on time-sync information. That is, the second important information determination module 50 may automatically determine the second important information based on at least one operation of the operations.

First, the second important information determination module 50 may (1) determine a part in which the word similarity to the first important information is equal to or greater than the threshold in the other data as the second important information. For example, the second important information determination module 50 may determine a part in which the word similarity to the first important information is equal to or greater than the threshold as the second important information in the reference data (e.g., note data) which is the other data when the first important information is determined in the STT data by the first important information determination module 40. In other words, the second important information determination module 50 may determine a part including relatively many same or similar words as or to the first important information in reference data (e.g., note data) which is the other data as the second important information.

As a more specific example, the second important information determination module 50 may identify a part including same words as or similar words to the first important information, in a number of a threshold or more, in the other data, and also determine the identified part as the second important information. In this case, the similar word may be identified based on the edit distance. As an example, the second important information determination module 50 may identify a part including the same words (e.g., "Daglo") or the similar words (e.g., "Dagulo", "Dagunglo", and "Dageunglo") to the first important information in the threshold or more, in the reference data (e.g., note data) which is the other data, and also determine the identified part as the second important information. For reference, the second important information determination module 50 may check even an edit distance based similar word, and determine whether the same or similar word is included, and determine the second important information, by considering "a problem in that a substitution error in which some of the STT data becomes wrong frequently occurs" or "a problem in that an error in which a character is wrongly recognized by OCR in the case of the reference data".

Further, the second important information determination module 50 may (2) determine a part in which the sentence embedding vector similarity to the first important information is equal to or greater than the threshold in the other data as the second important information. As a more specific example, the second important information determination module 50 performs sentence embedding for the first important information, and in the other data (second data) different from the data (first data) in which the first important information is determined, perform a sentence embedding vector for sentences or paragraphs to determine a part in which a similarity between both vectors is equal to or greater than a threshold as the second important information.

Further, the second important information determination module 50 may (3) determine the second important information in the other data based on a result output by a question answering (QA) model in relation to the first important information and the other data. More specifically, the second important information determination module 50 may input a question i) the other data (second data) different from the first important information and ii) "what is a paragraph related to the first important information in the second data" into the QA model, and then determine a sentence or a paragraph of the second data output by the QA model as the second important information.

Further, the second important information determination module 50 may @determine the second important information in the other data based on time-sync information. According to an exemplary embodiment, the second important information determination module 50 may determine the second important information by considering a time when the other data (second data) is changed based on a timestamp information linked with the audio signal. As an example, the second important information determination module 50 may determine the second important information through an association between "timestamp information in which the user inputs the text in the note" and "timestamp information linked with the audio signal" when the other data (second data) is the note data. Further, the second important information determination module 50 may determine the second important information through an association between "timestamp information in which a mouse is clicked or scrolled" and "timestamp information linked with the audio signal" when the other data (second data) is the content data or the learning material data.

As an exemplary embodiment, the second important information determination module 50 may generate user interface (UI) data for guiding determination of the second important information, and also determine the second important information linked with the first important information based on information input through the UI in the other data (second data). In other words, the second important information determination module 50 may determine the second important information linked with the first important information based on the user input. For example, the second important information determination module 50 may generate UI data for guiding determination of the second important information in the linked note data (second data) among the reference data, and determine the second important information based on the user input through the UI when the first important information is determined in the STT data (first data) by the first important information determination module 40. For example, the second important information determination module 50 visually segment and display second important information candidates determined based on the similarity to the first important information among the linked note data which is the second data, and determine the second important information according to user selection among the second important information candidates.

According to an exemplary embodiment of the present disclosure, the computing device 100 may acquire additional reference data. Further, the computing device 100 may determine third important information linked with the first important information and the second important information in the additional reference data. Further, the computing device 100 may link the first important information, the second important information, and the third important information with each other. For example, the computing device 100 may acquire content data (e.g., learning assistance video data, reference book data, etc.) linked with the speech signal as the additional reference data when acquiring the note data linked with the speech signal as the reference data. Further, the computing device 100 may determine the third important information linked with the first important information and the second important information in the content data linked with the speech signal, which is acquired as the additional reference data when determining the first important information in the STT data, and determining the second important information in the note data linked with the speech signal which is the reference data. In other words, in an additional example, determine a tripe data pair constituted by "a specific part (first important information) in the STT result text, a specific part (second important information) in the note data, and a specific part (third important information) in the linked content".

According to an exemplary embodiment of the present disclosure, the reconfiguration module 60 may reconfigure the STT data based on the first important information or the second important information, and provide the reconfigured STT data. Here, the reconfigured STT data may include only STT data determined as an important part. Further, the reconfigured STT data may include a language unit larger than a language unit of the first important information or the second important information. As an example, when the language unit of first important information or the second important information is the word unit, the reconfigured STT data may include a sentence unit or a paragraph unit which is the language unit larger than the word unit.

According to an exemplary embodiment of the present disclosure, the reconfiguration module 60 may reconfigure the reference data based on the first important information or the second important information, and generate the reconfigured reference data. In this case, when the reference data includes video data, the reconfigured reference data may be generated by combining (or splicing) only partial video determined as the important part. As an example, the reconfiguration module 60 may generate reference data edited by combining only an image including important information based on a timestamp.

According to an exemplary embodiment of the present disclosure, the reconfiguration module 60 reconfigures each of the STT data and the reference data based on the first important information or the second important information, and then fuses the reconfigured STT data and the reconfigured reference data to also generate hybrid type core reconfigured data. The core reconfigured data extracts important parts of different types of data, and links the extracted important parts with each other, and provides the linked important parts jointly as a single data, thereby maximizing the efficiency of important information management.

According to an exemplary embodiment of the present disclosure, the reconfiguration module 60 may generate summary information for the STT data based on the first important information or the second important information. In this case, the summary information may be generated by using a weight based on the first important information or the second important information. As an example, when the first important information is determined in the reference data (e.g., upload of a highlight part of a lecture material) by the first important information determination module 40, and the second important information linked with the STT data is determined by the second important information determination module 50, the reconfiguration module 60 may generate summary information for the STT data while assigning the weight to the second important information of the STT data.

According to an exemplary embodiment of the present disclosure, each of "first important information determined first in data selected among the STT data and the reference data" and "second important information determined according to the first important part in the remaining data not selected" may be generated based on an operation determined by the user input (manually determined) or automatically determined. This may be classified into four exemplary embodiments as in Table 1 below.

TABLE 1

| Classification | First important information Manually determined | First important information Automatically determined |
|---|---|---|
| Second important information Manually determined | Fourth exemplary embodiment | Third exemplary embodiment |
| Second important information Automatically determined | First exemplary embodiment | Second exemplary embodiment |

According to an exemplary embodiment of the present disclosure, (1) the first exemplary embodiment is an exemplary embodiment in which the first important information is manually determined and the second important information is automatically determined. For example, the computing device 100 may determine the first important information in the selected data (=first data) based on the user input (e.g., directly input a highlight or detect a highlighted part in an uploaded linked learning material), and automatically determine second important part related to (linked with) the first important information in the remaining data (=second data) not selected based on the various operations.

(2) The second exemplary embodiment is an exemplary embodiment in which the first important information is automatically determined and the second important information is automatically determined. For example, the computing device 100 may automatically determine the first important information in the selected data (=first data) based on predetermined keyword information, and automatically determine the second important part related to (linked with) the first important information in the remaining data (=second data) not selected based on the various operations.

(3) The third exemplary embodiment is an exemplary embodiment in which the first important information is automatically determined and the second important information is manually determined. For example, the computing device 100 may automatically determine the first important information in the selected data (=first data) based on the predetermined keyword information, provide the UI data for guiding determination of the second important information related to (linked with) the first important information in the remaining data (=second data) not selected, and manually determine the second important information linked with the first important information based on information input through the UI.

(4) The fourth exemplary embodiment is an exemplary embodiment in which the first important information is manually determined and the second important information is manually determined. For example, the computing device 100 may determine the first important information in the selected data (=first data) based on the user input (e.g., directly input a highlight or detect a highlighted part in an uploaded linked learning material), provide the UI data for guiding determination of the second important information related to (linked with) the first important information in the remaining data (=second data) not selected, and manually determine the second important information linked with the first important information based on the information input through the UI.

Hereinafter, the UI illustrated in FIGS. 4 to 7 may include audio data A (e.g., audio data included in a moving picture), STT data B, note data C, and content data D. Meanwhile, in respect to the exemplary embodiment described in FIGS. 4 to 7, the first exemplary embodiment, i.e., "an exemplary embodiment in which the first important information is manually determined and the second important information is automatically determined" is primarily described. In other words, the computing device 100 may determine the first important information in the selected data (=first data) based on the user input (e.g., directly input a highlight or detect a highlighted part in an uploaded linked learning material), and automatically determine second important part related to (linked with) the first important information in the remaining data (=second data) not selected based on the various operations. Further, the computing device 100 may highlight and provide the determined first important part and second important part.

Figure 4:
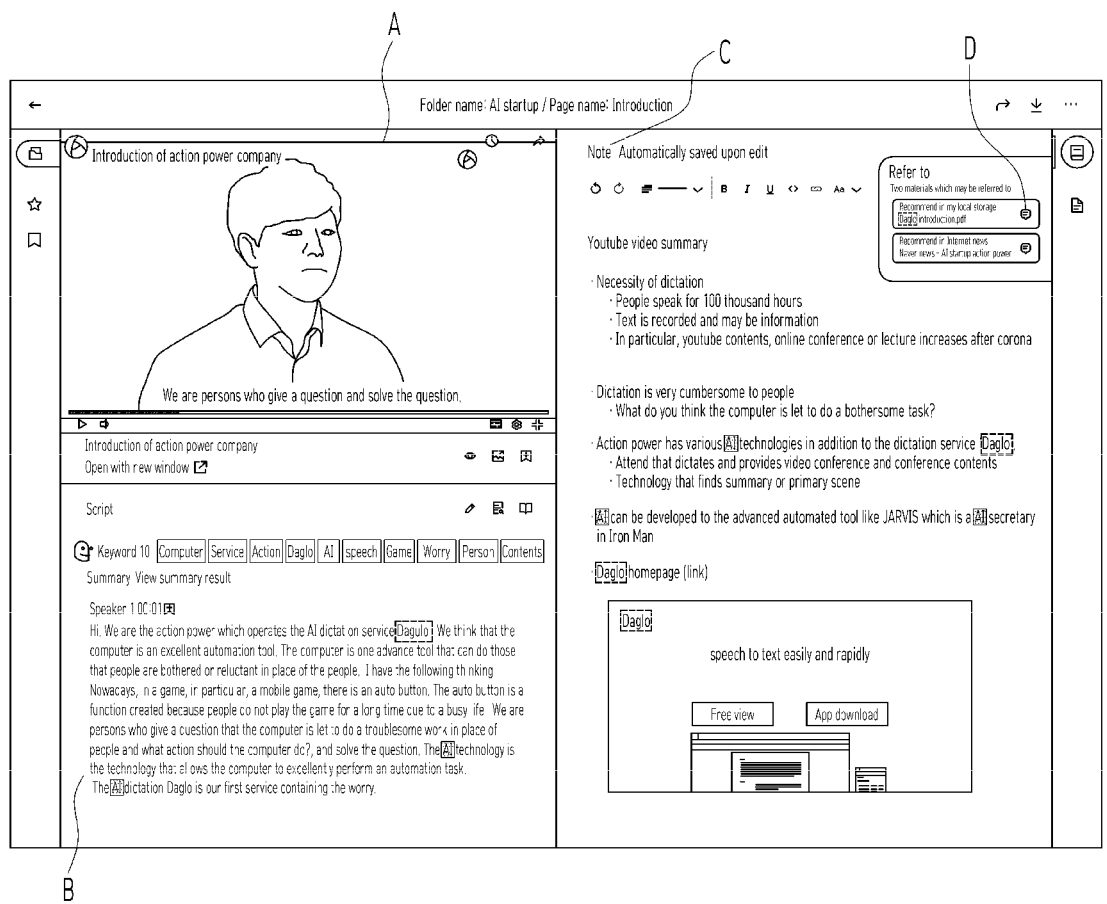
FIG. 4 is a diagram exemplarily illustrating an STT result-note UI when an STT result text is determined as important information in the STT result text according to an exemplary embodiment of the present disclosure.
Figure 5:
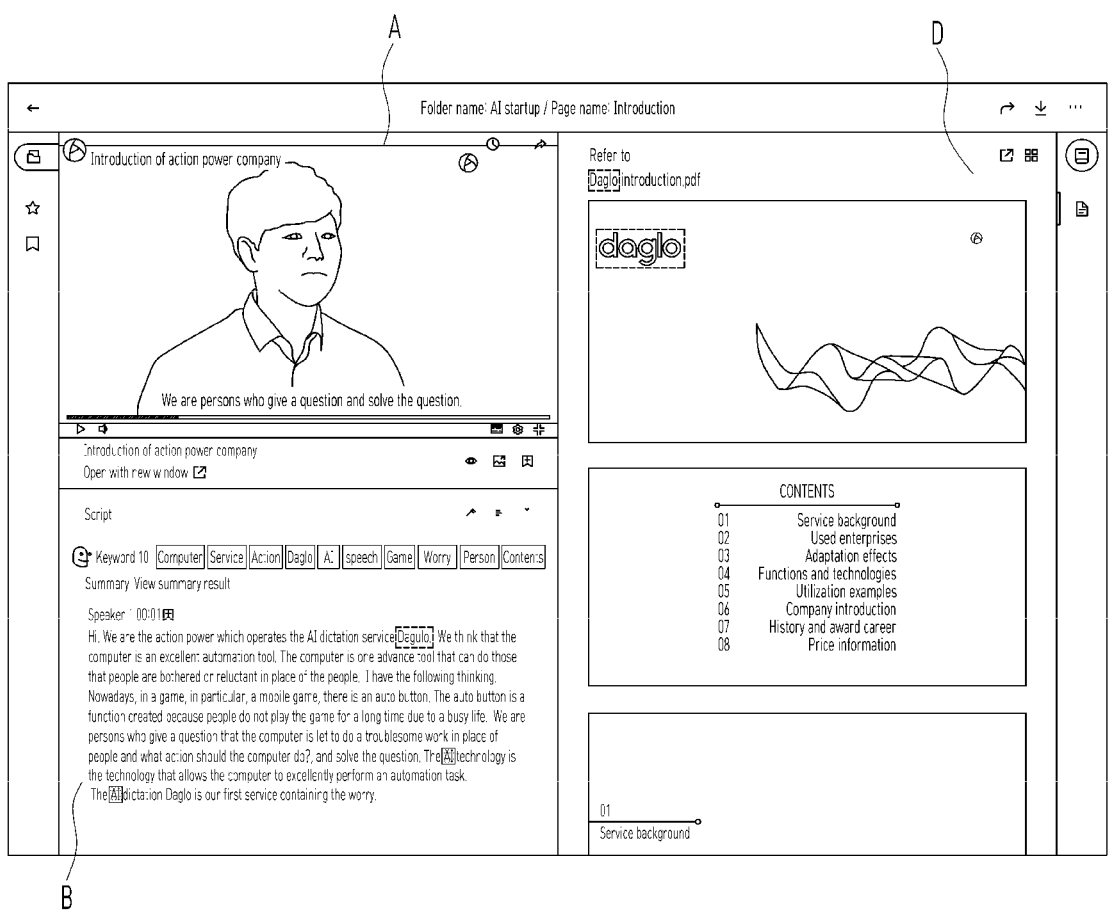
FIG. 5 is a diagram exemplarily illustrating an STT result-link content UI when the STT result text is determined as important information in the STT result text according to an exemplary embodiment of the present disclosure.
Figure 6:
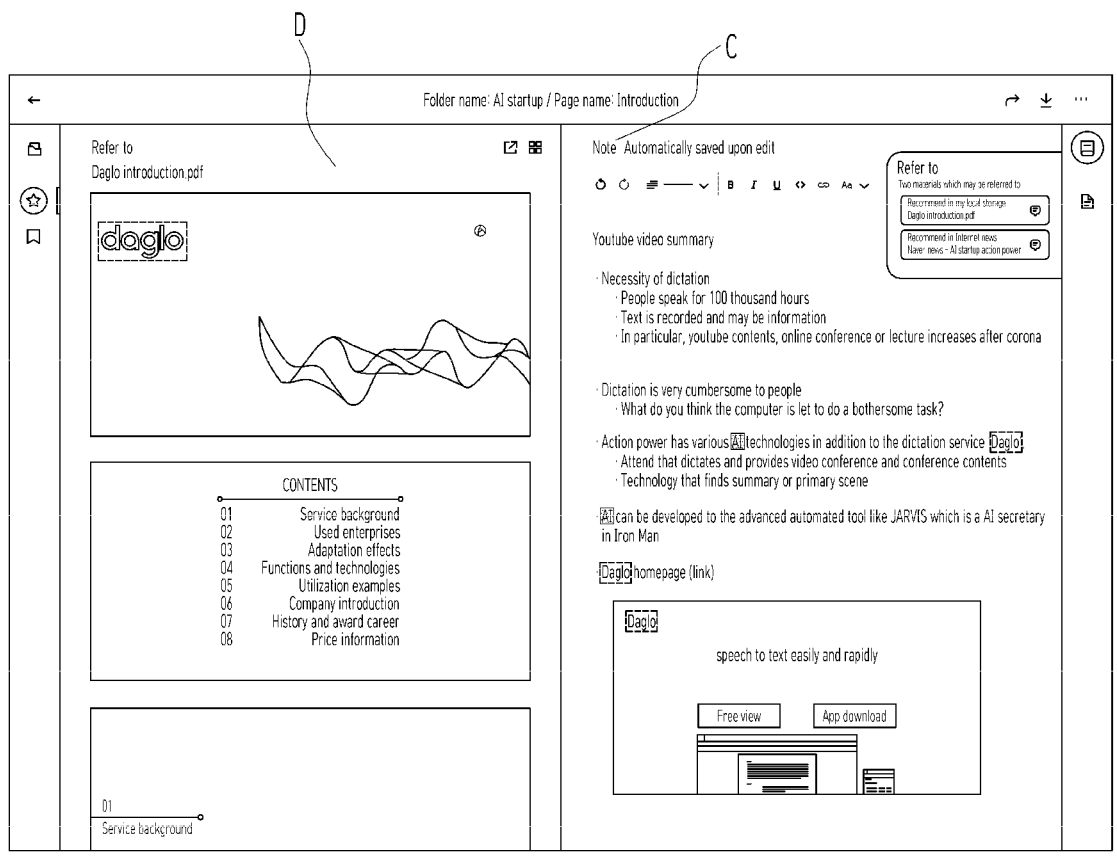
FIG. 6 is a diagram exemplarily illustrating a link content-note UI when the STT result text is determined as important information in the STT result text according to an exemplary embodiment of the present disclosure.

FIG. 4 is a diagram exemplarily illustrating "an STT result & note" UI when an STT result text is determined as first important information in the STT result text according to an exemplary embodiment of the present disclosure, FIG. 5 is a diagram exemplarily illustrating "an STT result & link content" UI when the STT result text is determined as first important information in the STT result text according to an exemplary embodiment of the present disclosure, and FIG. 6 is a diagram exemplarily illustrating "a link content & note" UI when the STT result text is determined as first important information in the STT result text according to an exemplary embodiment of the present disclosure. In the exemplary embodiment to be described with reference to FIGS. 4 to 8, the content data D linked with the speech signal is illustrated, but the present disclosure is not limited thereto, and learning material data linked with the speech signal may also be used instead of the linked content data. In FIGS. 4 to 8, (A) may refer to input audio data (or video data including the audio data), (B) may refer to STT data, (C) may refer to note data which the user creates by referring to (A), and (D) may refer to content data linked with the speech signal.

FIG. 4 is a diagram exemplarily illustrating "an STT result & note" UI when "Daglo" and "AI(artificial intelligence)" are determined as important information in the STT result text (STT data) according to an exemplary embodiment of the present disclosure, FIG. 5 is a diagram exemplarily illustrating "an STT result & link content" UI when "Daglo" and "AI" are determined as important information in the STT result text (STT data) according to an exemplary embodiment of the present disclosure, and FIG. 6 is a diagram exemplarily illustrating "a link content & note" UI when "Daglo" and "AI" are determined as important information in the STT result text according to an exemplary embodiment of the present disclosure. Through the UI illustrated through FIGS. 4 to 6 and FIGS. 7 to 8 to be described below, the user may add, change, delete, or edit (bold processing, underline processing, highlight processing, etc.) the text.

For example, referring to FIG. 4, the computing device 100 may determine "Dagulo" and "AI" as the first important information based on the user input in the STT data B. Further, the computing device 100 may determine the second important information linked with the first important information in the note data C which is the data (second data) not selected. As an example, even though the user determines "Dagulo" wrongly output from the STT data B as the first important information, the computing device 100 may identify a similar word to "Dagulo" in the note data C based on the edit distance, and find "Daglo" which is the similar word to the "Dagulo" determine as the second important information. In this case, the computing device 100 may also determine an other language letter of daglo for the similar word identified based on the edit distance as the second important information. Further, the computing device 100 may determine the second important information by using at least any one of a plurality of operations of automatically determining the second important information even with respect to "AI" determined as the first important information.

For example, referring to FIG. 5, the computing device 100 may determine "Dagulo" and "AI" as the first important information based on the user input in the STT data B. Further, the computing device 100 may determine the second important information linked with the first important information in the content data D which is the data (second data) not selected. As an example, even though the user determines "Dagulo" wrongly output from the STT data B as the first important information, the computing device 100 may identify a similar word to "Dagulo" in the note data C based on the edit distance, and find "Daglo" which is the similar word to "Dagulo" and determine "Dagulo" as the second important information. In this case, the computing device 100 may also determine an other language letter of daglo for the similar word identified based on the edit distance as the second important information. Further, although omitted in the linked content data D of FIG. 5, the computing device 100 may determine the second important information among the linked content data D by using at least any one of a plurality of operations of automatically determining the second important information even with respect to "AI" determined as the first important information.

Referring to FIG. 6, the computing device 100 may acquire additional reference data (e.g., third data). Further, the computing device 100 may determine third important information linked with the first important information and the second important information in the additional reference data. Further, the computing device 100 may link the first important information, the second important information, and the third important information with each other. For example, the computing device 100 may acquire content data D linked with the speech signal as the additional reference data when acquiring the note data C linked with the speech signal as the reference data. Further, the computing device 100 may determine the third important information linked with the first important information and the second important information in the content data D (=third data) linked with the speech signal, which is acquired as the additional reference data when determining the first important information in the STT data B (=first data), and determining the second important information in the note data C (=second data) linked with the speech signal which is the reference data. In other words, in an additional example, a tripe data pair constituted by "a specific part (first important information) in the STT result text, a specific part (second important information) in the note data, and a specific part (third important information) in the related content", and visually segmented and displayed by highlight, etc.

Figure 7:
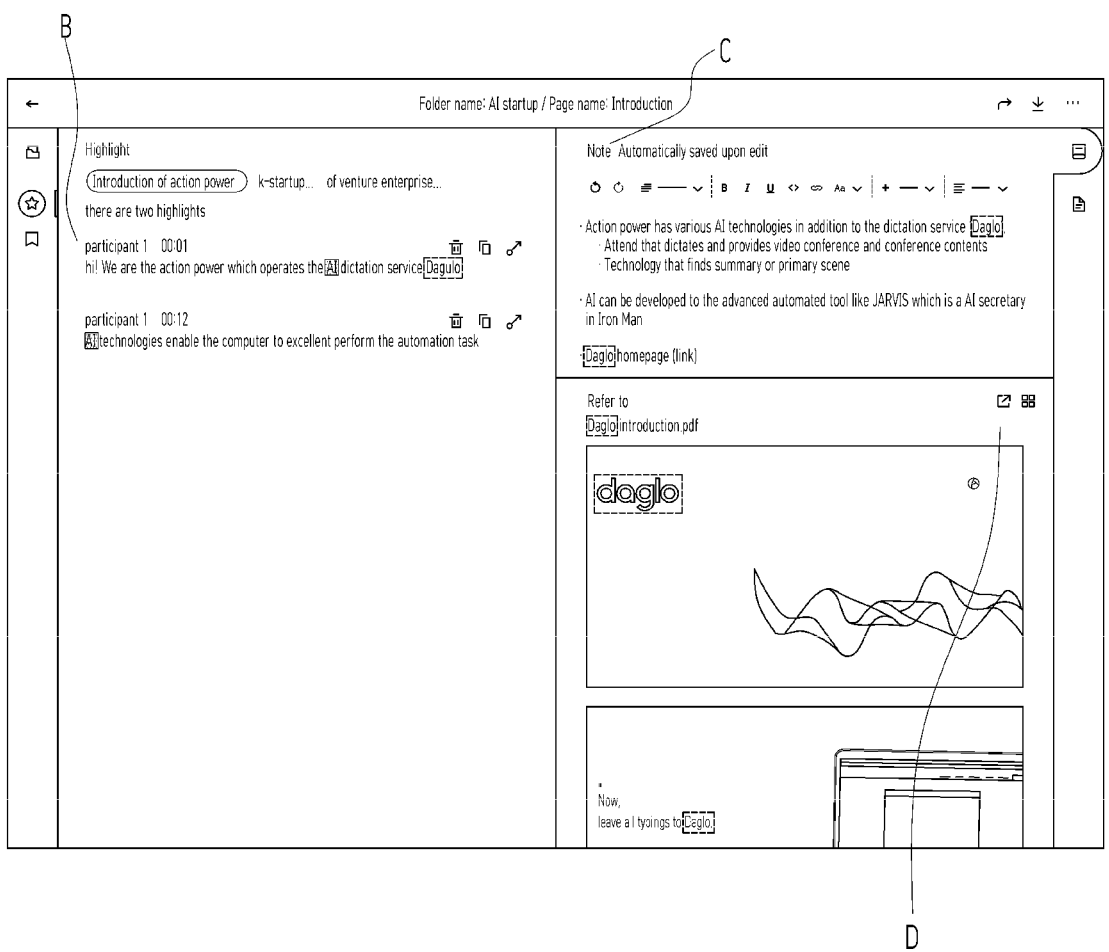
FIG. 7 is a diagram exemplarily illustrating a UI provided by collecting important information in separate pages according to an exemplary embodiment of the present disclosure.

FIG. 7 is a diagram exemplarily illustrating a UI provided by collecting important information in separate pages according to an exemplary embodiment of the present disclosure.

For example, referring to FIG. 7, the computing device 100 may collect and provide important information (parts) for each data to the user in a separate page. Referring to (B) of FIG. 7, the computing device 100 may reconfigure the STT data based on the first important information or the second important information, and provide the reconfigured STT data. In this case, the reconfigured STT data may include only STT data determined as the important part, and the reconfigured STT data may include a language unit larger than a language unit of the first important information or the second important information. Referring to (C) and (D) of FIG. 7, the computing device 100 may reconfigure the reference data (e.g., note data C and linked content data D) based on the first important information or the second important information, and provide the reconfigured reference data. In this case, the reconfigured reference data may include only reference data determined as the important part, and the reconfigured reference data may include a language unit larger than a language unit of the first important information or the second important information. For example, when the first important information or the second important information is a 'word' unit, the computing device 100 may collect each data (e.g., STT result text, note, and related content) in units of a sentence including the corresponding word, and provide the collected data to the user.

For reference, FIG. 7 illustrates one example of a screen of collecting and providing only important parts of note data C and content data D at a right side when the user selects "Dagulo" highlight in the STT data B. Further, looking at the highlighted parts on the left side of FIG. 7, even though the user highlights only "Dagulo" in the STT data B, the computing device 100 may actually display from the beginning of the sentence containing the corresponding part. Additionally, the computing device 100 may display speaker information and the time of speech together, and provide the corresponding video or speech part based on a timestamp when the corresponding part is clicked. In addition, the note data C and content data D on the right side of FIG. 7 do not display the entire note data or content data, and the computing device 100 may collect and provide only a 'Dagulo' related part in the note data C or collect and provide only a 'Dagulo' related pdf page in the content data D. Further, as described above, even though a word unit corresponding to "Dagulo" in the STT data is determined as the first important information, the computing device 100 may determine 'Daglo' and an other language letter of 'daglo' jointly as the second important information in the note data C or the content data D based on the edit distance and the other language letter, and collect and provide only important information.

Figure 8:
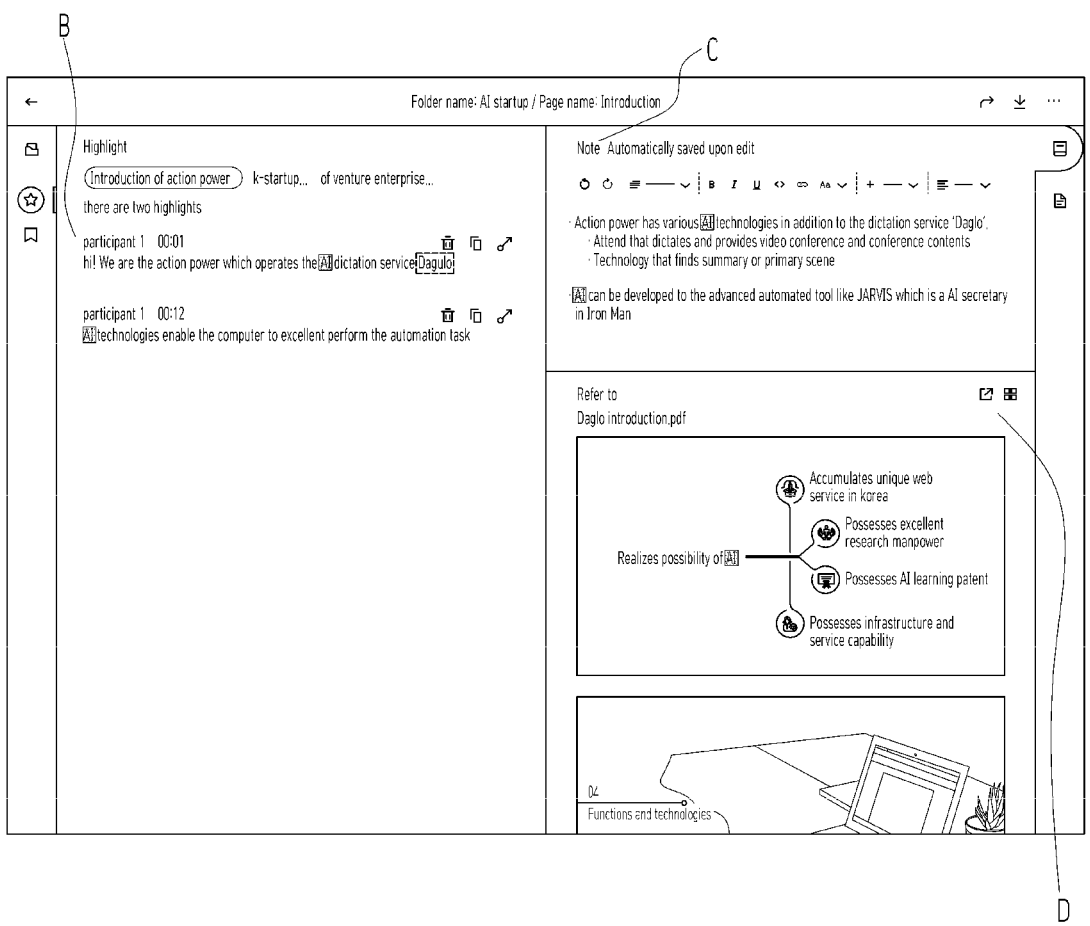
FIG. 8 is a diagram exemplarily illustrating a screen for collecting and providing only important information from reference data on a right side jointly when a highlight is selected for a specific word according to an exemplary embodiment of the present disclosure.

FIG. 8 is a diagram exemplarily illustrating a screen of collecting and providing only important information from reference data on a right side jointly when a highlight is selected for a specific word according to an exemplary embodiment of the present disclosure. Specifically, FIG. 8 is a diagram exemplarily illustrating a screen of collecting and providing only important information of the note data C and the content data D on the right side jointly when a "AI" highlight is selected according to an exemplary embodiment of the present disclosure.

For reference, FIG. 8 illustrates one example of a screen of collecting and providing only important parts of note data C and content data D on the right side jointly when the user selects "AI" highlight in the STT data B. Further, looking at the highlighted parts on the left side of FIG. 8, even though the user highlights only "AI" in the STT data B, the computing device 100 may actually display from the beginning of the sentence containing the corresponding part. Additionally, the computing device 100 may display speaker information and the time of speech together, and provide the corresponding video or speech part based on a timestamp when the corresponding part is clicked. In addition, the note data C and content data D on the right side of FIG. 8 do not display the entire note data C or content data D, and the computing device 100 may collect and provide only an 'AI' related part in the note data C or collect and provide only an 'AI' related pdf page in the content data D.

Although omitted in FIGS. 7 and 8, according to an exemplary embodiment, if the input file includes an image, an image reconfigured from only partial images determined as important information may be provided to the user. According to another exemplary embodiment, weights are assigned to important information, and based on this, summary information for the STT data may be generated and provided to the user.

Figure 9:
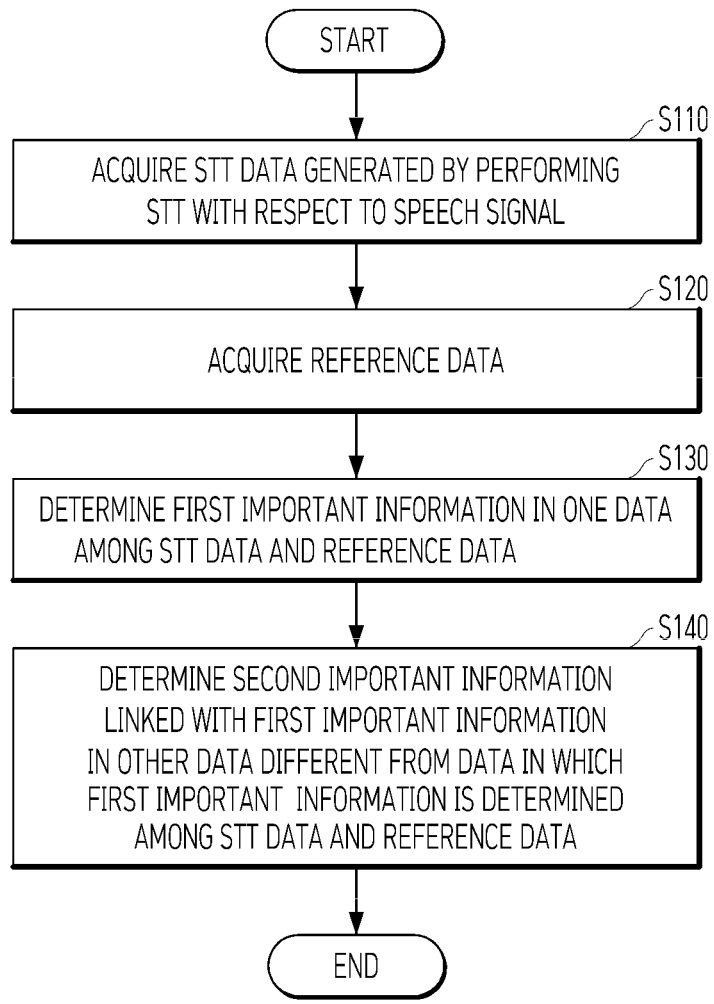
FIG. 9 is a flowchart for a method for determining important parts from a speech-to-text (STT) result and reference data according to an exemplary embodiment of the present disclosure.

FIG. 9 is a flowchart for a method for determining important parts from a speech-to-text (STT) result and reference data according to an exemplary embodiment of the present disclosure.

The method for determining the important part among the STT result and reference data illustrated in FIG. 9 may be performed by the computing device 100. Hereinafter, even though not mentioned in detail, the contents regarding the computing device 100 may also be similarly applied to a description of a method for determining the important part among the STT result and reference data.

Referring to FIG. 9, the method for determining the important part among the STT result and the reference data according to an exemplary embodiment of the present disclosure may include a step of acquiring STT data generated by performing STT with respect to a speech signal (S110), a step of acquiring reference data (S120), a step of determining first important information in any one data among the STT data and the reference data (S130), and a step of determining the second important information linked with the first important information in other data different from data in which the first important information is determined among the STT data and the reference data (S140).

Step S110 above is a step of acquiring the STT data generated by performing STT with respect to the speech signal.

Step S120 above is a step of acquiring the reference data. Here, the reference data may be identified based on a similarity analysis to the STT data or the similarity analysis may include an edit distance analysis. The reference data may include at least one data of note data linked with the speech signal, content data linked with the speech signal, or learning material data linked with the speech signal. The note data may be text data which a user create in relation to the speech signal, and the content data may be data for content related to the speech signal, such as related YouTube video, news articles, and files stored in local data. The learning material data may be lecture material in PDF or PPT format if the speech signal is related to the lecture. The content data or learning material data may be identified and recommended based on the edit distance analysis as described above, but is not limited thereto and may be data directly uploaded by the user.

Step S130 above is a step of determining the first important information in one data among the STT data and the reference data. Step S130 may include at least one of a step of determining the first important information based on a user input, or a step of determining the first important information based on predetermined keyword information.

Step S140 above is a step of determining the second important information linked with the first important information in other data different from data in which the first important information is determined and the other data among the STT data and the reference data. Step S140 may include at least one of a step of determining a part in which a word similarity to the first important information is equal to or greater than a threshold as second important information in the other data, a step of determining a part in which a sentence embedding vector similarity to the first important information is equal to or greater than a threshold in the other data as the second important information, a step of determining the second important information in the other data based on a result output by a question answering (QA) model in relation to the first important information and the other data, or a step of determining the second important information in the other data based on time-sync information. Further, step S140 may include a step of generating user interface (UI) data for guiding determination of the second important information, and a step of determining the second important information linked with the first important information based on information input through the UI in the other data. Further, step S140 may include a step of determining a language unit different from the first important information as the second important information in the other data, and the different language unit may include a word unit, a sentence unit, or a paragraph unit.

Meanwhile, the method for determining the important part among the STT result and the reference data may further include a step of acquiring additional reference data, a step of determining third important information linked with the first important information and the second important information in the additional reference data, and a step of linking the first important information, the second important information, and the third important information with each other.

Further, the method for determining the important part among the STT result and the reference data may further include a step of reconfiguring the STT data based on the first important information or the second important information, and provide the reconfigured STT data, and the reconfigured STT data may include only STT data determined as an important part, and the reconfigured STT data may include a language unit larger than a language unit of the first important information or the second important information.

Further, the method for determining the important part among the STT result and the reference data may further include a step of generating summary information for the STT data based on the first important information or the second important information, and the summary information may be generated by using a weight based on the first important information or the second important information.

The steps mentioned in the above description may be further split into additional steps, or combined into fewer steps according to an implementation example of the present disclosure. Further, some steps may also be omitted as necessary, and an order between the steps may be changed.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 10:
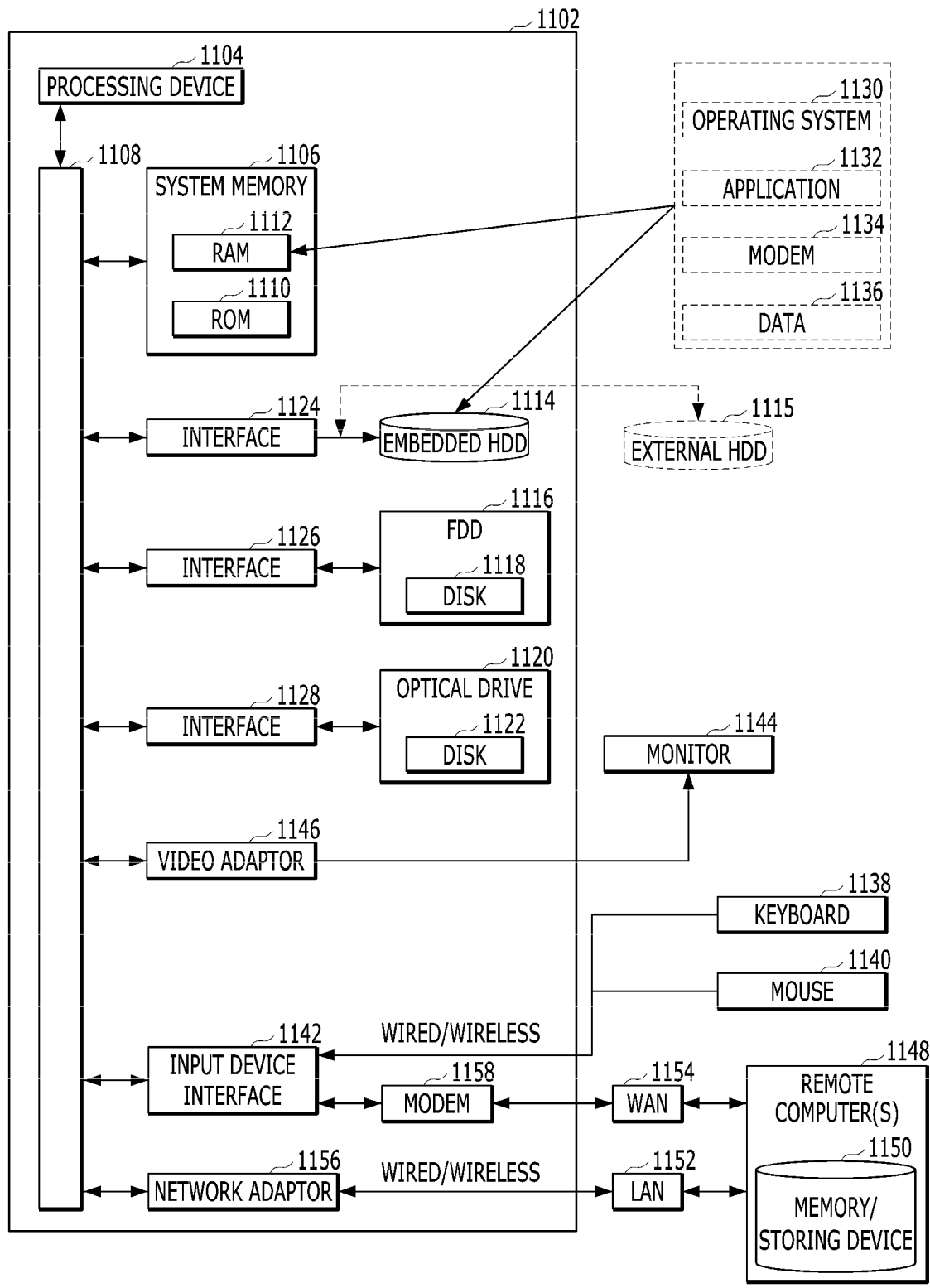
FIG. 10 is a simple and normal schematic view of an exemplary computing environment in which exemplary embodiments of the present disclosure may be implemented.

FIG. 10 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection.

The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

What is claimed is:

1. A method for determining important parts among a speech-to-text (STT) result and reference data, the method performed by a computing device including at least one processor, the method comprising:
    acquiring STT data generated by performing STT with respect to a speech signal;
    acquiring reference data;
    determining first important information in one data among the STT data and the reference data; and
    determining second important information linked with the first important information in other data different from data in which the first important information is determined among the STT data and the reference data,
    wherein the determining of the second important information linked with the first important information in the other data different from the data in which the first important information is determined among the STT data and the reference data includes at least one of:
    determining a part in which a word similarity to the first important information is equal to or greater than a threshold as the second important information in the other data,
    determining a part in which a sentence embedding vector similarity to the first important information is equal to or greater than a threshold in the other data as the second important information,
    determining the second important information in the other data based on a result output by a question answering (QA) model in relation to the first important information and the other data, or
    determining the second important information in the other data based on time-sync information.

2. The method of claim 1, wherein the determining of the first important information in the one data among the STT data and the reference data includes at least one of:
    determining the first important information based on a user input, or
    determining the first important information based on predetermined keyword information.

3. The method of claim 2, wherein the determining of the first important information based on the predetermined keyword information includes:
    selecting the one data among the STT data and the reference data based on the predetermined keyword information, and
    determining the first important information in the selected data based on the predetermined keyword information.

4. The method of claim 3, wherein the selecting of the one data among the STT data and the reference data based on the predetermined keyword information includes selecting data including more words similar to the predetermined keyword among the STT data and the reference data, and
    wherein a word similar to the predetermined keyword is determined based on an edit distance analysis.

5. The method of claim 3, wherein the determining of the first important information in the selected data based on the predetermined keyword information includes identifying a part in the selected data, which has a highest similarity to the predetermined keyword, and determining the first important information based on the identified part, and
    wherein the similarity to the predetermined keyword is determined based on an edit distance analysis.

6. The method of claim 1, wherein the determining of the part in which the word similarity to the first important information is equal to or greater than the threshold as the second important information in the other data includes:

identifying a part including same words as or similar words to the first important information in a number of a threshold or more, in the other data, and determining the identified part as the second important information, and wherein a similar word is identified based on an edit distance.

7. The method of claim 1, wherein the determining of the second important information linked with the first important information in the other data different from the data in which the first important information is determined among the STT data and the reference data further includes:

generating user interface (UI) data for guiding determination of the second important information, and determining the second important information linked with the first important information based on information input through the UI in the other data.

8. The method of claim 1, wherein the determining of the second important information linked with the first important information in the other data different from the data in which the first important information is determined among the STT data and the reference data includes determining a language unit different from the first important information as the second important information in the other data, and wherein the different language unit includes a word unit, a sentence unit, or a paragraph unit.

9. The method of claim 1, wherein the reference data is identified based on a similarity analysis to the STT data, and wherein the similarity analysis includes an edit distance analysis.

10. The method of claim 9, wherein the reference data includes at least one data of:

note data linked with the speech signal, content data linked with the speech signal, or learning material data linked with the speech signal.

11. The method of claim 1, further comprising:

acquiring additional reference data;

determining third important information linked with the first important information and the second important information in the additional reference data; and linking the first important information, the second important information, and the third important information with each other.

12. The method of claim 1, further comprising:

reconfiguring the STT data based on the first important information or the second important information, and providing the reconfigured STT data, wherein the reconfigured STT data includes only STT data determined as an important part, and wherein the reconfigured STT data includes a language unit larger than a language unit of the first important information or the second important information.

13. The method of claim 1, further comprising:

reconfiguring the reference data based on the first important information or the second important information, and generating the reconfigured reference data, wherein when the reference data includes video data, the reconfigured reference data is generated by combining only partial videos determined as an important part.

14. The method of claim 1, further comprising:

generating summary information for the STT data based on the first important information or the second important information, and wherein the summary information is generated by using a weight based on the first important information or the second important information.

15. A computer program stored in a non-transitory computer-readable storage medium, wherein the computer program allows one or more processor to execute the following operations for determining important parts among an a speech-to-text (STT) result and reference data when the computer program is executed by one or more processors, the operations comprising:

an operation of acquiring STT data generated by performing STT with respect to a speech signal;

an operation of acquiring reference data;

an operation of determining first important information in one data among the STT data and the reference data; and an operation of determining second important information linked with the first important information in other data different from data in which the first important information is determined among the STT data and the reference data, wherein the operation of determining the second important information linked with the first important information in the other data different from the data in which the first important information is determined among the STT data and the reference data includes at least one of:

an operation of determining a part in which a word similarity to the first important information is equal to or great than a threshold as the second important information in the other data, an operation of determining a part in which a sentence embedding vector similarity to the first important information is equal to or greater than a threshold in the other data as the second important information, an operation of determining the second important information in the other data based on a result output by a question answering (QA) model in relation to the first important information and the other data, or an operation of determining the second important information in the other data based on time-sync information.

16. A computing device for determining important parts among an a speech-to-text (STT) result and reference data, comprising:

at least one processor; and a memory, wherein the at least one processor is configured to:

acquire STT data generated by performing STT with respect to a speech signal, acquire reference data, determine first important information in one data among the STT data and the reference data, and determine second important information linked with the first important information in other data different from data in which the first important information is determined among the STT data and the reference data, wherein the determining of the second important information linked with the first important information in the other data different from the data in which the first important information is determined among the STT data and the reference data includes at least one of:

determining a part in which a word similarity to the first important information is equal to or greater than a threshold as the second important information in the other data, determining a part in which a sentence embedding vector similarity to the first important information is equal to or greater than a threshold in the other data as the second important information, determining the second important information in the other data based on a result output by a question answering (QA) model in relation to the first important information and the other data, or determining the second important information in the other data based on time-sync information.

\* \* \* \* \*